J. SHANKS.

COMBINED VALVE AND SIPHON.

APPLICATION FILED JAN. 22, 1916.

Reissued June 13, 1916.

14,150.

2 SHEETS—SHEET 1.

Inventor:
John Shanks
by Calver & Calver,
Attys.

THE COLUMBIA PLANOGRAPH CO., WASHINGTON, D. C.

J. SHANKS.

COMBINED VALVE AND SIPHON.

APPLICATION FILED JAN. 22, 1916.

Reissued June 13, 1916.

14,150.

2 SHEETS—SHEET 2.

Inventor:
John Shanks
by Kates & Kates,
Attys.

THE COLUMBIA PLANOGRAPH CO., WASHINGTON, D. C.

UNITED STATES PATENT OFFICE.

JOHN SHANKS, OF BARRHEAD, SCOTLAND.

COMBINED VALVE AND SIPHON.

14,150. Specification of Reissued Letters Patent. Reissued June 13, 1916.

Original No. 1,090,885, dated March 24, 1914, Serial No. 755,190. Application for reissue filed January 22, 1916. Serial No. 73,741.

*To all whom it may concern:*

Be it known that I, JOHN SHANKS, a subject of the King of the United Kingdom of Great Britain and Ireland, and residing at Barrhead, Renfrewshire, Scotland, have invented a certain new and useful Improvement in Combined Valves and Siphons, of which the following is a specification.

This invention relates to a combined valve and siphon particularly designed for flushing tanks of water closets, urinals and the like, and has for its general object to provide a device whereby siphonic action will be initiated automatically and which may be employed for manual actuation, while insuring that in the latter case operative conditions are not disturbed by actuation of the device prior to the cistern having been entirely filled.

Figure 1:
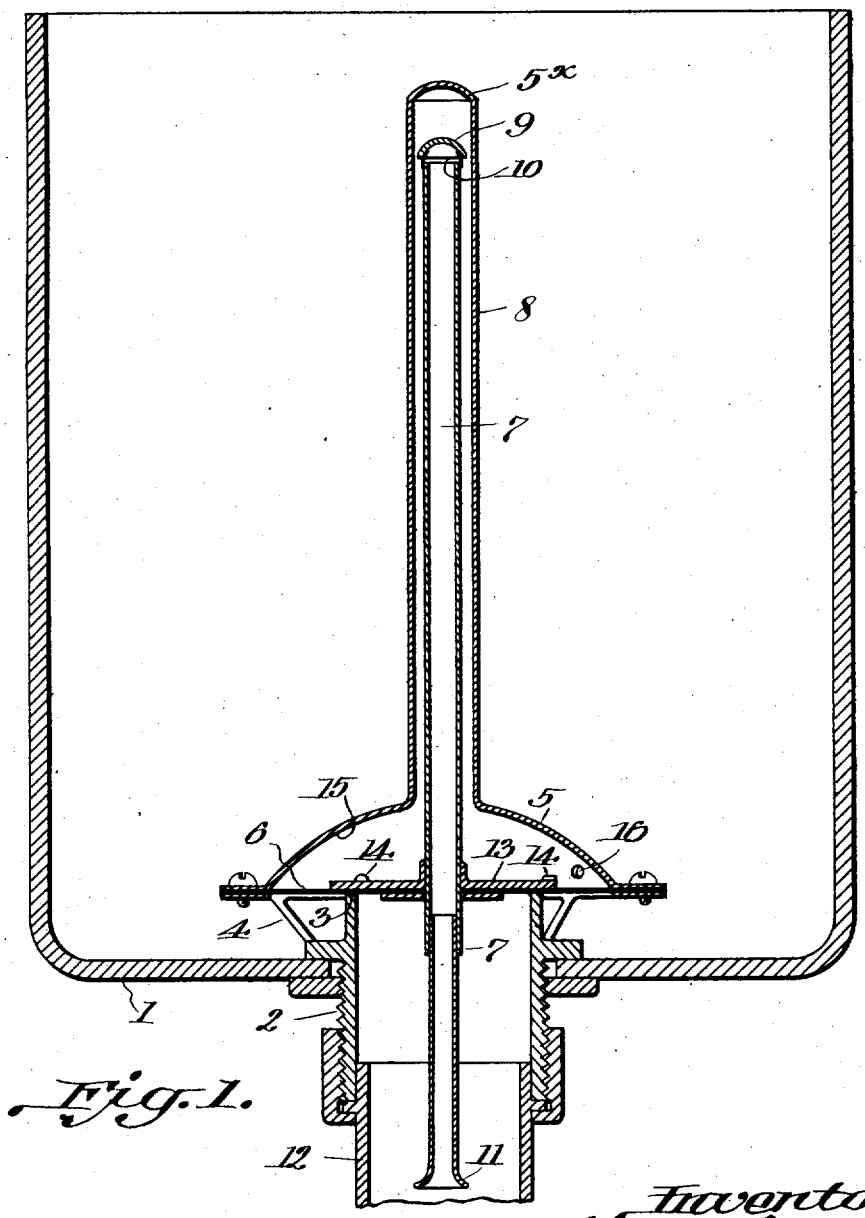
Figure 2:
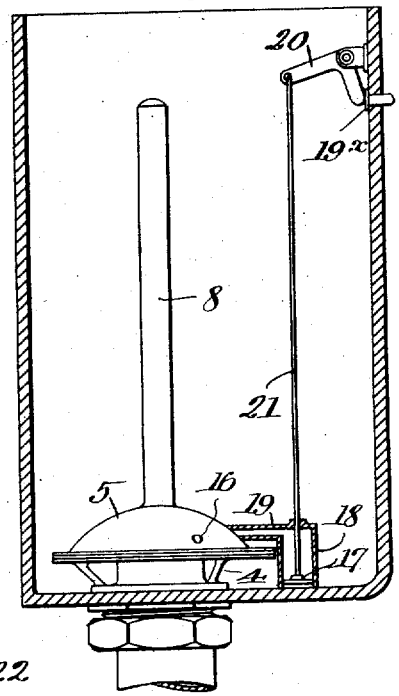
Figure 3:
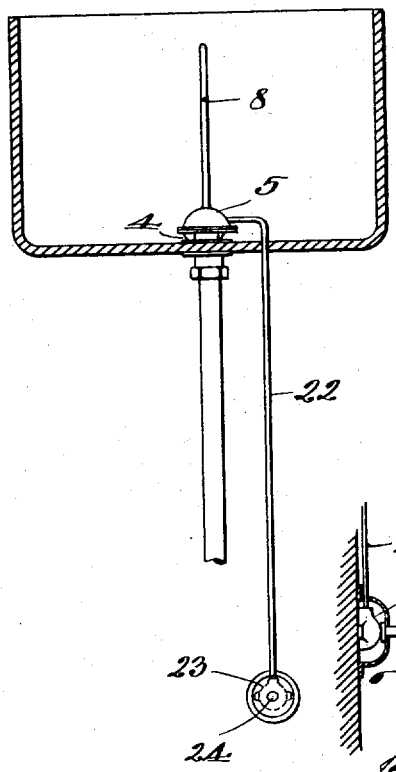
Figure 4:
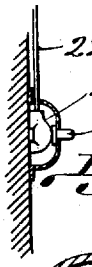
Figure 5:
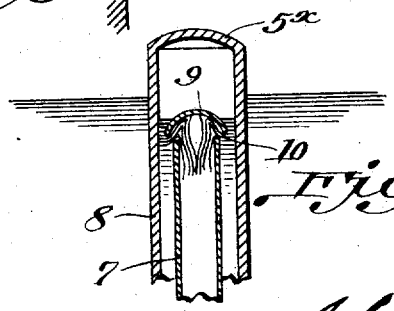

In the accompanying drawings Figures 1, 2 and 3 are vertical sections of flushing tanks equipped with alternative constructions of devices embodying the invention; Fig. 4 shows a detail hereinafter referred to; Fig. 5 is a diagrammatic view illustrating the operation of the device.

Referring particularly to Fig. 1, secured to the bottom of the flushing tank 1 is an outlet connection 2 including a tubular portion affording a valve seat 3, said tubular portion being surrounded by an open-work structure 4 arranged to permit passage of water. The structure 4 serves to support a superposed casing 5 between which and the upper end of said structure is interposed a diaphragm 6 of leather, rubber or other suitable material constituting a valve adapted normally to engage the seat 3. Secured to the diaphragm 6, and disposed substantially coaxial with the outlet connection 2, is a pipe connection 7 which uprises within an upwardly also co-axial extending portion 8 of the casing 5 to a point adjacent to the upper closed end $5^{\times}$ of said portion 8, and is preferably provided at its upper extremity with a suitably supported cap 9 arranged so as to afford a narrow substantially annular opening 10 through which the overflow water passes, as hereinafter described. The pipe connection 7 also passes downwardly through the diaphragm 6 to a convenient point beneath the seat 3 and preferably terminates at its lower end in a flared portion 11 which tends to spread the overflow water as it passes into the discharge pipe 12.

The diaphragm 6 is preferably provided at its upper face with a disk 13 which serves to maintain the diaphragm on its seat 3 and is equipped with projections 14 which engage with the inner face 15 of the superposed casing 5 and permit water to pass between the disk 13 and the casing, when the diaphragm 6 is raised off its seat 3, said casing 5 being formed with a small aperture 16 for the admission of water thereto.

It will be understood that on the inflow of water into the tank 1, water will pass through the open-work structure 4 and through the aperture 16 in the casing 5, thus equalizing the pressure on the diaphragm 6 which is held on its seat 3 by the weight of the pipe connection 7 and other parts connected thereto, and that water will rise in the upwardly extending portion 8 of the casing 5. The water having risen to the upper edge of the inner pipe 7 is caused to move upwardly along the concave surface of the cap 9 by capillary action, as indicated in Fig. 5, and passes downwardly over the upper edge of the pipe. By the provision of said cap the stream lines of the water are caused to approach the axis of the pipe, so that, the pipe 7 being of relatively small diameter, the cross-sectional area of the bore is entirely filled by the water in its downward passage, thereby initiating siphonic action. The size of the aperture 16 is such that although the water will rise within the pipe 8 at approximately the same rate as the water level in the cistern or tank 1, on the latter being filled at the usual comparatively slow rate, this passage is not large enough to permit of a sufficiently rapid rush of water to follow up the siphonic action. Therefore, the pressure upon the upper side of the diaphragm is relieved with the effect that the latter is raised and the water now finds a considerable cross sectional area for its passage over the edge 3 of the pipe 12, and the contents of the tank will be rapidly drained.

The above described construction, which is automatic, is applicable to tanks of the overhead type and to tanks of the so-called low-down type, and can be adapted for manual actuation, for instance, in the case of a tank of the low-down type, Fig. 2, by the provision of a device which may take the form of a piston 17 working in an auxiliary casing 18 communicating by means of a branch 19 with the superposed casing 5 so that on movement of the piston 17, as by means of a push button 18x, fitted directly on the tank, and a bell-crank lever 20 and rod 21, a small volume of fluid may be impelled upwardly within the extension 8 of the superposed casing 5 and the siphonic action be established.

In another modification, Figs. 3 and 4, applicable more particularly to tanks of the overhead type, the siphonic action is established manually by means of an auxiliary supply of water introduced to the superposed casing 5, for instance, through the intermediary of piping 22 led from a suitably incased hollow flexible member 23 adapted to be acted upon as by means of a push button 24 within convenient reach of the operator.

In the constructions last described, even if the apparatus be operated before the cistern is entirely filled with water, the water level inside the pipe 8 will not be permanently affected, so that, on the water assuming its proper level in the cistern, the entire device will be ready for repeated manipulation.

From the foregoing it will be understood that the pipes 7 and 8 together form a siphon of which the pipe 8 is the intake member and the pipe 7 the discharge member. It will also be understood that the opening or lifting of the diaphragm valve is due to the fact that the discharge member of the siphon is of greater capacity than the capacity of the restricted aperture 16 serving as the inlet to the chamber of the casing 5; so that when the siphon is started, whether manually or automatically, the water pressure on the upper side of said diaphragm valve will be lessened by siphonic suction, and the greater water pressure on the lower side of said valve will cause said valve to be lifted or opened and to remain in such position until the tank is nearly emptied, when the said valve will resume its seated or closed position by its weight and the weight of the parts which it supports.

What I claim is:—

1. The combination with a tank having an outlet provided with a valve seat, of a casing within said tank having a closed upward extension and provided with means for admitting fluid thereto, a valve coöperating with said valve seat and exposed to the fluid pressures in said tank and casing respectively, and a siphon pipe carried by said valve, and arranged coaxial with said extension, and communicating with said outlet.

2. The combination with a tank having an outlet provided with a valve seat, of a casing within said tank having a closed upward extension and a relatively small opening communicating with said tank, a valve coöperating with said valve seat and exposed to the fluid pressures in said tank and casing respectively, and a siphon pipe carried by said valve and arranged coaxial with said extension, and communicating with said outlet.

3. The combination with a tank having an outlet provided with a valve seat, of a casing within said tank having a closed upward extension and provided with means for admitting fluid thereto, a diaphragm closing the lower end of said casing and constituting a valve coöperating with said valve seat, and a siphon pipe carried by said diaphragm and arranged coaxial with said extension, and communicating with said outlet.

4. The combination with a tank having an outlet provided with a valve seat, of a casing within said tank having a closed upward extension and provided with means for admitting fluid thereto, a valve coöperating with said valve seat and exposed to the fluid pressures in said tank and casing respectively, and a siphon pipe carried by said valve and arranged coaxial with said extension, and communicating with said outlet, said siphon pipe being provided at its upper end with a cap arranged to afford a narrow opening between the same and the end of said pipe.

5. The combination with a tank having an outlet provided with a valve seat, of a casing in said tank having a restricted inlet aperture to its chamber, a diaphragm valve closing the bottom of said chamber and also normally closing the chamber of said tank to said outlet, and a siphon the inlet member of which communicates with the chamber of said casing and the outlet member of which siphon is of greater capacity than the capacity of said restricted inlet to said last-named chamber; whereby when the siphon is started said valve will be opened and fluid be discharged from said tank, and the said valve then be automatically closed.

6. The combination with a tank having an outlet provided with a valve seat, of a casing in said tank having a restricted inlet aperture to its chamber, a diaphragm valve closing the bottom of said chamber and also normally closing the chamber of said tank to said outlet, and a siphon the inlet member of which communicates with the chamber of said casing and the outlet member of which siphon is of greater capacity than the capacity of said restricted inlet to said last-named chamber, said diaphragm valve comprising a disk provided on its upper side with projections to impinge against the inner wall of said casing and thus prevent the stoppage of inflow of water to the chamber of said casing; whereby when the siphon is started said valve will be opened and fluid be discharged from said tank, and the said valve then be automatically closed.

JOHN SHANKS.

Copies of this patent may be obtained for five cents each, by addressing the "Commissioner of Patents, Washington, D. C."